United States Patent
Luo et al.

(10) Patent No.: US 12,372,019 B2
(45) Date of Patent: Jul. 29, 2025

(54) SYSTEMS AND METHODS FOR MANAGING AMMONIA SLIP WITH A HEATER

(71) Applicant: Cummins Inc., Columbus, IN (US)

(72) Inventors: Jinyong Luo, Columbus, IN (US); Lu Qiu, Columbus, IN (US); David Schmidt, Indianapolis, IN (US); Xiaobo Song, Columbus, IN (US); Yuying Song, Columbus, IN (US); Ying Yuan, Rexford, NY (US)

(73) Assignee: Cummins Inc., Columbus, IN (US)

( * ) Notice: Subject to any disclaimer, the term of this patent is extended or adjusted under 35 U.S.C. 154(b) by 6 days.

(21) Appl. No.: 18/554,710

(22) PCT Filed: Apr. 11, 2022

(86) PCT No.: PCT/US2022/024270
§ 371 (c)(1),
(2) Date: Oct. 10, 2023

(87) PCT Pub. No.: WO2022/221200
PCT Pub. Date: Oct. 20, 2022

(65) Prior Publication Data
US 2024/0218818 A1    Jul. 4, 2024

Related U.S. Application Data

(60) Provisional application No. 63/173,726, filed on Apr. 12, 2021.

(51) Int. Cl.
*F01N 3/20* (2006.01)
*B01D 53/94* (2006.01)

(52) U.S. Cl.
CPC ......... *F01N 3/202* (2013.01); *B01D 53/9418* (2013.01); *B01D 53/9436* (2013.01);
(Continued)

(58) Field of Classification Search
CPC .... F01N 3/0871; F01N 3/2006; F01N 3/2013; F01N 3/202; F01N 3/2026; F01N 3/208;
(Continued)

(56) References Cited

U.S. PATENT DOCUMENTS 4,085,193 A    4/1978 Nakajima et al.
8,112,986 B2    2/2012 Kurtz
(Continued)

FOREIGN PATENT DOCUMENTS

FR    3081507 A1    11/2019
WO    WO-2008/147068    12/2008
WO    WO-2015/048099 A1    4/2015

OTHER PUBLICATIONS

International Search Report and Written Opinion on PCT PCT/US2022/024270 mailed Jul. 25, 2022.
Foreign Search Report on EP Patent Application No. 22788725.4 dtd Oct. 10, 2024.

*Primary Examiner* — Binh Q Tran
(74) *Attorney, Agent, or Firm* — Foley & Lardner LLP

(57) ABSTRACT

Systems and methods for controlling and managing ammonia slip are provided. A method includes: receiving, by a controller, data regarding operation of an exhaust aftertreatment system; determining, by the controller, that a condition for ammonia slip is present based on the data regarding operation of the exhaust aftertreatment system; determining, by the controller, that a condition for ammonia storage is present based on the data regarding operation of the exhaust aftertreatment system; and, commanding, by the controller, a heater to activate and warm a component of the exhaust aftertreatment system to reduce the stored amount of ammonia.

16 Claims, 7 Drawing Sheets

(52) U.S. Cl.
CPC ......... *B01D 53/9495* (2013.01); *F01N 3/208* (2013.01); *B01D 2257/404* (2013.01); *B01D 2257/406* (2013.01); *B01D 2258/012* (2013.01); *F01N 3/2006* (2013.01); *F01N 3/2013* (2013.01); *F01N 2240/04* (2013.01); *F01N 2240/16* (2013.01); *F01N 2550/03* (2013.01); *F01N 2550/22* (2013.01); *F01N 2610/02* (2013.01); *F01N 2900/04* (2013.01); *F01N 2900/0602* (2013.01); *F01N 2900/1411* (2013.01); *F01N 2900/1602* (2013.01); *F01N 2900/1626* (2013.01); *F01N 2900/1806* (2013.01)

(58) Field of Classification Search
CPC ............... F01N 13/009; F01N 2240/04; F01N 2240/16; F01N 2240/18; F01N 2550/03; F01N 2550/22; F01N 2560/021; F01N 2560/026; F01N 2570/18; F01N 2610/02; F01N 2900/04; F01N 2900/0602; F01N 2900/1411; F01N 2900/1616; F01N 2900/1621; F01N 2900/1622; F01N 2900/1626; F01N 2900/1806

See application file for complete search history.

(56) References Cited

U.S. PATENT DOCUMENTS

| | | | |
|---|---|---|---|
| 8,473,177 | B2 | 6/2013 | Madurai Kumar et al. |
| 8,534,053 | B2 | 9/2013 | Asaura et al. |
| 8,813,478 | B2 | 8/2014 | Gonze et al. |
| 8,820,050 | B2 | 9/2014 | Dubkov et al. |
| 2004/0098979 | A1 | 5/2004 | Hammerle et al. |
| 2007/0044456 | A1 | 3/2007 | Upadhyay et al. |
| 2007/0044457 | A1 | 3/2007 | Upadhyay et al. |
| 2007/0079597 | A1 | 4/2007 | Wang et al. |
| 2013/0152553 | A1* | 6/2013 | Gonze .................. F01N 3/2066 60/286 |
| 2016/0367973 | A1 | 12/2016 | Larsson et al. |
| 2018/0274419 | A1* | 9/2018 | Sakuma ................ F01N 3/2026 |
| 2018/0334939 | A1* | 11/2018 | Mital .................... F01N 3/2066 |
| 2019/0155230 | A1* | 5/2019 | Culbertson ............. F01N 3/208 |
| 2019/0195107 | A1* | 6/2019 | Shirasawa ............... F01N 3/208 |
| 2019/0195114 | A1* | 6/2019 | Ono ...................... F01N 3/2066 |
| 2019/0368402 | A1* | 12/2019 | Barrientos Betancourt ................ F01N 3/0842 |
| 2021/0372310 | A1* | 12/2021 | Bare ...................... F01N 3/103 |

* cited by examiner

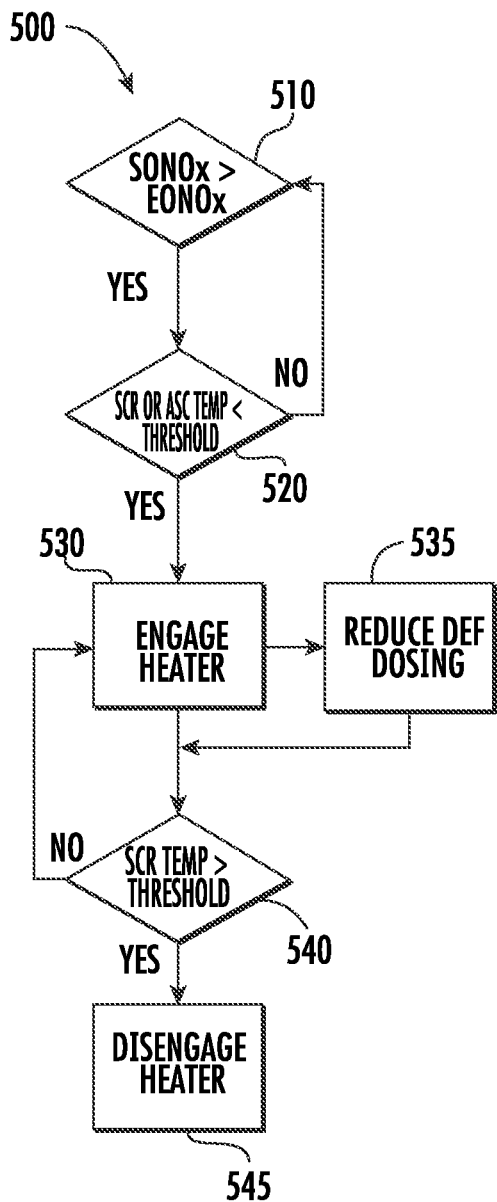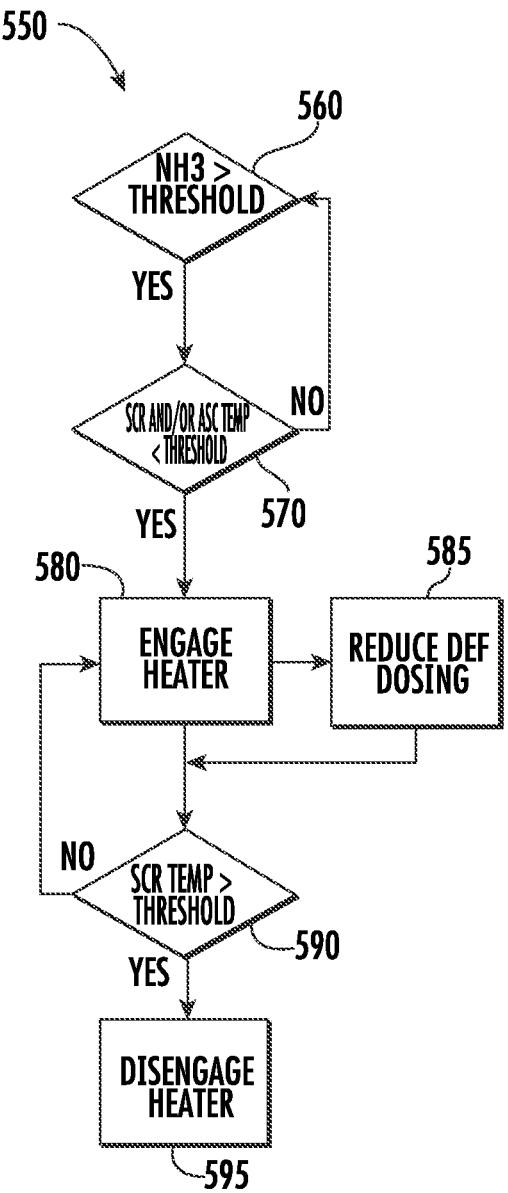
FIG. 5A
FIG. 5B

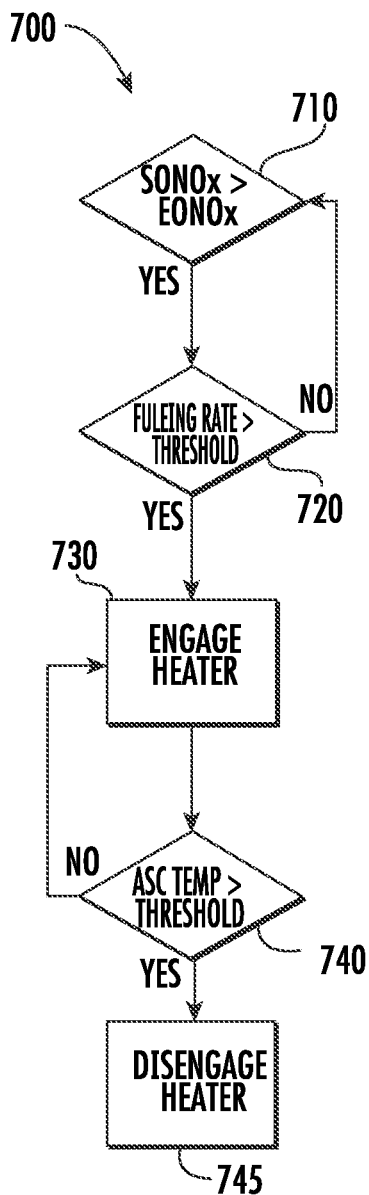 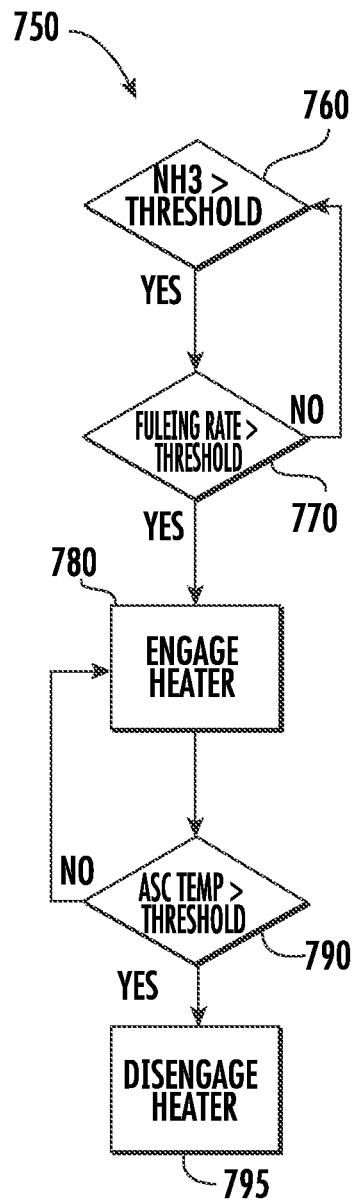
FIG. 7A
FIG. 7B

SYSTEMS AND METHODS FOR MANAGING AMMONIA SLIP WITH A HEATER

CROSS-REFERENCE TO RELATED APPLICATION

This application claims the benefit of and priority to U.S. Application No. 63/173,726, titled "SYSTEMS AND METHODS FOR MANAGING AMMONIA SLIP WITH A HEATER," filed Apr. 12, 2021, which is incorporated herein by reference in its entirety and for all purposes.

TECHNICAL FIELD

The present disclosure relates to systems and methods for managing ammonia slip in an exhaust aftertreatment system equipped with a heater.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards for engines. For example, emission tests for diesel compression-ignition engines may monitor the release of diesel particulate matter (PM), nitrogen oxides ($NO_x$), nitrous oxide ($N_2O$), ammonia ($NH_3$), hydrocarbons (HCs), carbon monoxide (CO), etc. in order to evaluate these emission characteristics relative to one or more thresholds or emission regulations.

Conventional exhaust gas aftertreatment systems include any of several different components to reduce the levels of harmful exhaust emissions present in exhaust gas. For example, certain exhaust aftertreatment systems for diesel-powered engines include various components, such as a diesel oxidation catalyst (DOC), a selective catalytic reduction (SCR) catalyst, a diesel particulate filter (DPF), and/or an ammonia slip catalyst (ASC) (also referred to as an ammonia oxidation catalyst (AMOX)). Each of the DOC, SCR catalyst, DPF, and/or ASC components is configured to perform a particular exhaust emissions treatment operation on the exhaust gas passing through or over the respective components in order to emit relatively less environmentally harmful gas into the environment.

SUMMARY

One embodiment relates to a method for managing and controlling ammonia slip from an exhaust aftertreatment system. The method includes: receiving, by a controller, data regarding operation of an exhaust aftertreatment system; determining, by the controller, that a condition for ammonia slip is present based on the data regarding operation of the exhaust aftertreatment system; determining, by the controller, that a condition for ammonia storage is present based on data regarding operation of the exhaust aftertreatment system; and, commanding, by the controller, a heater to activate and warm a component of the exhaust aftertreatment system to reduce the stored amount of ammonia. By reducing the amount of stored ammonia, the method reduces the possibility of ammonia slip through a controlled release of stored ammonia. Because ammonia release traditionally spikes as exhaust temperature ramps up through operation, by reducing the amount of stored ammonia prior to the ramp up, the method avoids the spike and reduces the possibility and/or amount of ammonia slip.

Another embodiment relates to a system. The system includes an exhaust aftertreatment system including a heater; and a controller coupled to the exhaust aftertreatment system. The controller is configured to: receive data regarding operation of the exhaust aftertreatment system; determine that a condition for ammonia slip is present based on the data regarding operation of the exhaust aftertreatment system; determine that a condition for ammonia storage is present based on the data regarding operation of the exhaust aftertreatment system; and command the heater to activate and warm a component of the exhaust aftertreatment system to reduce a stored amount of ammonia.

Still another embodiment relates to a non-transitory computer-readable storage medium comprising computer-readable instructions stored thereon that, when executed by a processor of a controller, causes the controller to perform certain operations. The operations include: receiving data regarding operation of an exhaust aftertreatment system, the data including at least one of a (i) sensed amount of engine-out NOx and a sensed amount of system-out NOx or (ii) a sensed amount of ammonia in an exhaust gas stream; determining that a condition for ammonia slip is present based on (i) the sensed amount of system-out NOx exceeding a sensed amount of engine-out NOx, or (ii) the sensed amount of ammonia in the exhaust gas stream exceeding a threshold; and commanding a heater to activate to warm a component of the exhaust aftertreatment system based on the condition for ammonia slip being present.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIG. 5A is a flow chart of a method for slowly raising the temperature of a component of the exhaust aftertreatment system, and particularly the SCR, of the system of FIG. 1 to reduce ammonia storage, according to an exemplary embodiment.

FIG. 5B is a flow chart of a method for slowly raising the temperature of a component of the exhaust aftertreatment system, and particularly the SCR, of the system of FIG. 1 to reduce ammonia storage, according to an exemplary embodiment.

FIG. 7A is a flow chart of a method for raising the temperature of an ammonia slip catalyst (ASC) of an exhaust aftertreatment system to reduce or mitigate ammonia slip, according to an exemplary embodiment.

FIG. 7B is a flow chart of a method for slowly raising the temperature of an ASC of an exhaust aftertreatment system to reduce or mitigate ammonia slip, according to an exemplary embodiment.

DETAILED DESCRIPTION

Figure 1:
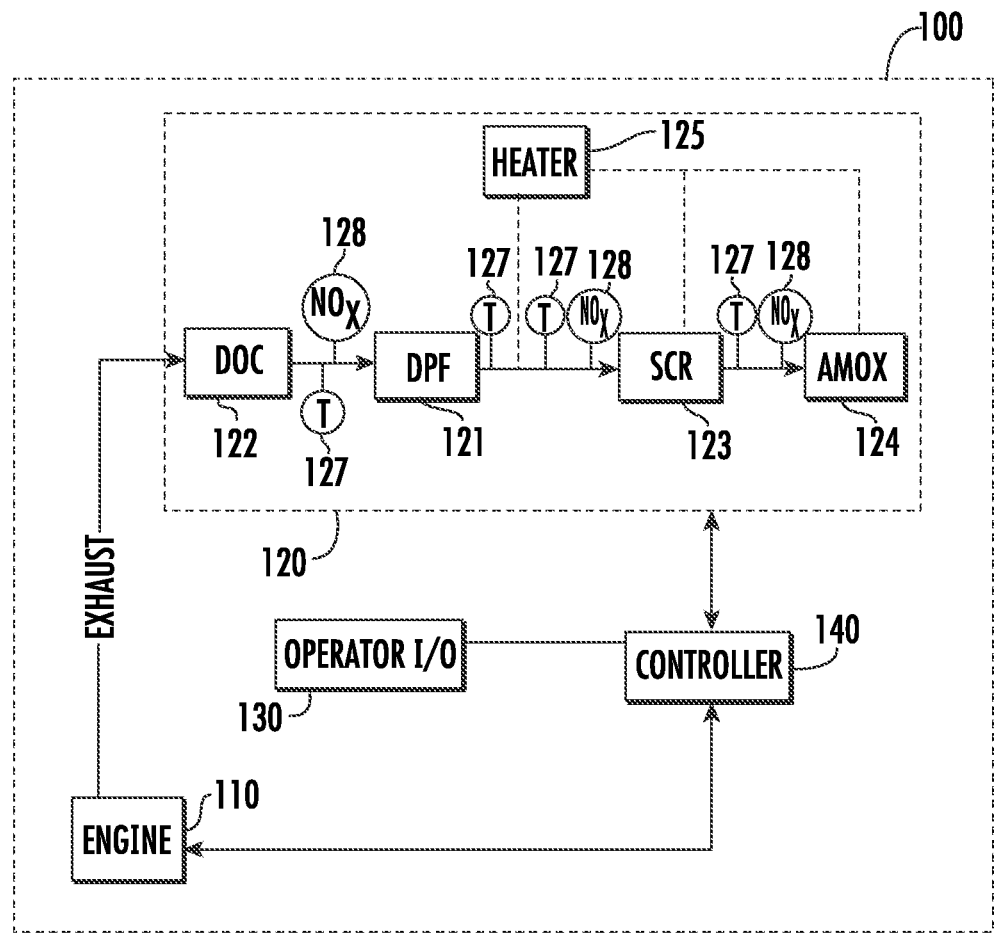
FIG. 1 is a schematic diagram of a system with a controller, according to an exemplary embodiment.

Following below are more detailed descriptions of various concepts related to, and implementations of, methods, apparatuses, and systems for managing and controlling ammonia slip from an exhaust aftertreatment system. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the Figures generally, the various embodiments disclosed herein relate to systems, apparatuses, and methods for managing and controlling ammonia slip from an exhaust aftertreatment system. "Ammonia slip" refers to ammonia that does not react with nitrous oxide (NOx) during the NOx reduction process and instead is released into the environment. In operation, ammonia is injected into the exhaust gas stream in the form of urea solution (or DEF, diesel exhaust fluid) and reacts with NOx in the presence of an exhaust aftertreatment system catalyst (selective catalytic reduction (SCR) catalyst)) to form less environmentally harmful constituents (e.g., water and nitrogen). However, some of the injected ammonia amount may not be completely used in the reaction. This remaining amount of ammonia may build up within the aftertreatment system and eventually be released into the atmosphere. This unreacted released amount of ammonia into the environment is known as ammonia slip, which may be harmful to the environment causing unwanted odor, among potentially other unwanted effects Additionally, one or more fault indicators (e.g., fault codes, malfunction indicator lamps, etc.) may be triggered since the tailpipe NOx sensor, used for OBD (on-board diagnostics) purpose, will read $NH_3$ as NOx due to cross-sensitivity. Therefore, managing and controlling ammonia slip and ammonia build up in an exhaust aftertreatment system is desired.

As described herein, a controller determines that a condition for ammonia slip is present based on data regarding operation of the exhaust aftertreatment system, determines that a stored amount of ammonia exceeds a threshold, and warms a component of the aftertreatment system to reduce the stored amount of ammonia. In particular and according to one embodiment, the exhaust aftertreatment system is embodied in a vehicle and includes a heater that increases the temperature of exhaust gas flowing through the aftertreatment system or of a component(s) within the aftertreatment system. Beneficially, as a SCR catalyst warms, this build up is reversed, and the ammonia that has built up on the SCR catalyst is released back into the exhaust gas stream. This controlled release of ammonia can be helpful for the exhaust gas NOx reduction process. If the SCR catalyst temperature spikes, a sudden relatively large amount of ammonia is released. In exhaust aftertreatment systems that include an ammonia slip catalyst (ASC), this sudden and large amount of released ammonia may overwhelm the ASC thereby causing ammonia slip. Further, if the ASC itself is not at a proper temperature, the ASC is unable to convert the excess ammonia into, e.g., nitrogen and water, which would lead to increased ammonia slip. The systems, apparatuses, and methods of the present disclosure are operable to effectively manage the release of stored ammonia to reduce ammonia slip from the aftertreatment system.

Referring now to FIG. 1, a system 100 is shown, according to an example embodiment. The system 100 includes an engine 110, an aftertreatment system 120, an operator input/output (I/O) device 130, and a controller 140, where the controller 140 is communicably coupled to each of the aforementioned components. In the configuration of FIG. 1, the system 100 is included in a vehicle. The vehicle may be any type of on-road or off-road vehicle including, but not limited to, wheel-loaders, fork-lift trucks, line-haul trucks, mid-range trucks (e.g., pick-up truck, etc.), sedans, coupes, tanks, airplanes, boats, and any other type of vehicle. In another embodiment, the system 100 may be embodied in a stationary piece of equipment, such as a power generator or genset. All such variations are intended to fall within the scope of the present disclosure.

The engine 110 may be any type of engine that generates exhaust gas, such as a gasoline, natural gas, or diesel engine, a hybrid engine (e.g., a combination of an internal combustion engine and an electric motor), and/or any other suitable engine. In the example depicted, the engine 110 is a diesel-powered compression-ignition engine.

The aftertreatment system 120 is in exhaust-gas receiving communication with the engine 110. The aftertreatment system includes a diesel particulate filter (DPF) 122, a diesel oxidation catalyst (DOC) 121, a selective catalytic reduction (SCR) system 123, an ammonia slip catalyst (ASC) 124, and a heater 125. The DOC 122 is structured to receive the exhaust gas from the engine 110 and to oxidize hydrocarbons and carbon monoxide in the exhaust gas. The DPF 121 is arranged or positioned downstream of the DOC 122 and structured to remove particulates, such as soot, from exhaust gas flowing in the exhaust gas stream. The DPF 121 includes an inlet, where the exhaust gas is received, and an outlet, where the exhaust gas exits after having particulate matter substantially filtered from the exhaust gas and/or converting the particulate matter into carbon dioxide. In some implementations, the DPF 121 or other components may be omitted. Additionally, although a particular arrangement is shown for the aftertreatment system 120 in FIG. 1, the arrangement of components within the aftertreatment system 120 may be different in other embodiments (e.g., the DPF 121 positioned downstream of the SCR 123 and AMOx 124, one or more components omitted or added, etc.).

The aftertreatment system 120 may further include a reductant delivery system which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The reductant may be injected upstream of the SCR 123 generally (or in particular, the SCR catalyst 126) by a DEF doser such that the SCR catalyst 126 receives a mixture of the reductant and exhaust gas. The reductant droplets then undergo the processes of evaporation, thermolysis, and hydrolysis to form gaseous ammonia within the decomposition chamber, the SCR catalyst 126, and/or the exhaust gas conduit system, which leaves the aftertreatment system 120. The aftertreatment system 120 may further include an oxidation catalyst (e.g., the DOC 122) fluidly coupled to the exhaust gas conduit system to oxidize hydrocarbons and carbon monoxide in the exhaust gas. In order to properly assist in this reduction, the DOC 122 may be required to be at a certain operating temperature. In some embodiments, this certain operating temperature is approximately between 200-500° C. In other embodiments, the certain operating temperature is the temperature at which the conversion efficiency of the DOC 122 exceeds a predefined threshold (e.g. the conversion of HC to less harmful compounds, which is known as the HC conversion efficiency).

The SCR 123 is configured to assist in the reduction of NOx emissions by accelerating a NOx reduction process between the ammonia and the NOx of the exhaust gas into diatomic nitrogen and water. If the SCR catalyst is not at or above a certain temperature, the acceleration of the NOx reduction process is limited and the SCR 123 may not be operating at a level of efficiency to meet regulations. In some embodiments, this certain temperature is approximately 200-600° C. The SCR catalyst may be made from a combination of an inactive material and an active catalyst, such that the inactive material (e.g. ceramic substrate) directs the exhaust gas towards the active catalyst, which is any sort of material suitable for catalytic reduction (e.g. metal exchanged zeolite (Fe or Cu/zeolite), base metals oxides like vanadium, molybdenum, tungsten, etc.).

When ammonia in the exhaust gas does not react with the SCR catalyst (either because the SCR 123 is below operating temperature or because the amount of dosed ammonia greatly exceeds the amount of NOx), the unreacted ammonia may bind to the SCR catalyst, becoming stored in the SCR 123. This stored ammonia is released from the SCR 123 as the SCR 123 warms, which can cause issues if the amount of ammonia released is greater than the amount of NOx passing through (i.e., more ammonia than needed for the amount of NOx, which can lead to ammonia slip). In some embodiments, the ASC 124 is included and structured to address ammonia slip by removing at least some excess ammonia from the treated exhaust gas before the treated exhaust is released into the atmosphere. As exhaust gas passes through the ASC 124, some of unreacted ammonia (i.e., unreacted with NOx) remaining in the exhaust gas is partially oxidized to NOx, which then consequently reacts with the remaining unreacted ammonia to form $N_2$ gas and water. However, similar to the SCR catalyst 126, if the ASC 124 is not at or above a certain temperature, the acceleration of the $NH_3$ oxidization process is limited and the ASC 124 may not be operating at a level of efficiency to meet regulations or desired parameters. In some embodiments, this certain temperature is approximately 250-300° C.

Because of the issues associated with excess stored ammonia, reducing the overall amount of ammonia stored on the SCR 123 and in the exhaust aftertreatment system is desired. Additionally, reducing ammonia storage is especially important in advance of a transient event. A transient event refers to a period of time in which a current power demand on the engine 110 is significantly different than a previous power demand (e.g., more than a threshold delta amount, such as twenty-five percent greater in power output). For example, an operator of the vehicle may depress the accelerator pedal as far or nearly as far as possible while passing another vehicle on a highway and then return to a previous steady-state position. This passing moment is a transient event. As another example, when the vehicle travels uphill after previous substantially non-slope traversal of the vehicle. This uphill travel may be a transient event. While described above with respect to vehicle speed, the transient moment/event may also be defined with respect to engine speed or torque or operation of other vehicle components (e.g., a spike in exhaust aftertreatment system temperature, etc.). For example, in other embodiments, an aftertreatment sensor (e.g. a NOx) sensor may be used to determine a characteristic of the aftertreatment system (e.g., engine out NOx) and if that value exceeds a predefined threshold, a transient event is determined (e.g., an increase in engine out NOx amount exceeding a predefined threshold value relative to a current engine out NOx amount may indicate a transient event or moment). In other words, a transient event may be determined based on the operational characteristics of the aftertreatment system (e.g., engine out NOx, system out NOx, etc.).

During a transient event, the aftertreatment system 120 often undergoes a rapid temperature change (e.g., for an increase in load or power output, an increase in temperature). In particular, an increase in temperature is caused in response to an increase in power demand on the engine 110. This situation results in an increase in engine-out exhaust gas temperature. As discussed earlier, when the SCR 123 warms rapidly (e.g., a temperature increase rate of change above a threshold value), substantially all or at least a significant amount of the ammonia stored on the SCR catalyst is released through that rapid warm up, and the insufficiently-warmed ASC 124 is unable to oxidize the higher amount of ammonia released during the transient event. This can lead to unacceptable levels of ammonia slip. As such, reducing the amount of ammonia stored on the SCR 123 prior to a transient event is desired. Further, the less ammonia that is stored on the SCR 123, the warmer the SCR 123 must be before the ammonia begins to be released. As such, reducing the amount of ammonia stored on the SCR 123 increases the likelihood that the ASC 124 will be at an operational temperature, which is also known as a light-off temperature, and refers to a temperature or temperature range at which the ASC 124 oxidizes ammonia at a desired rate.

Figure 2:
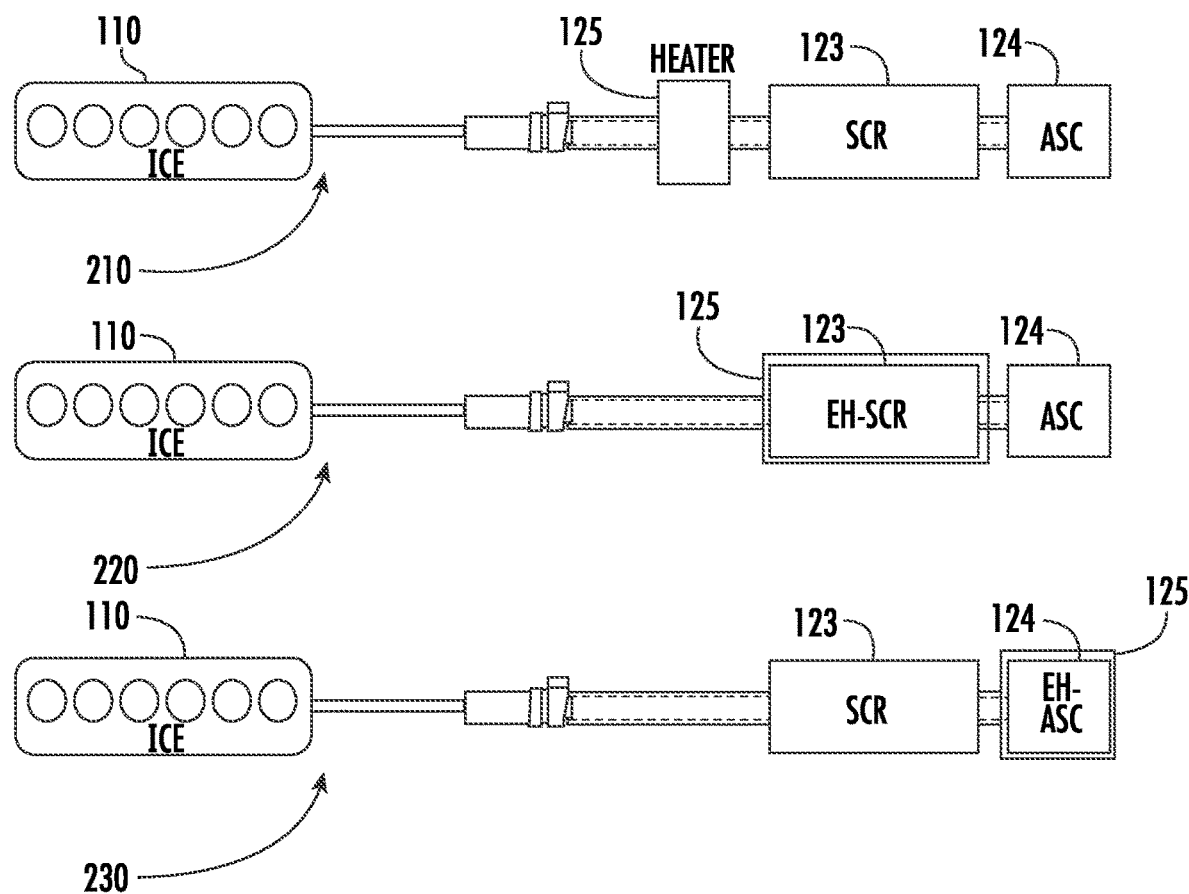
FIG. 2 is a schematic diagram of example architectures of a heater in an exhaust aftertreatment system positioned upstream of a SCR, integrated with a SCR, and integrated with an ammonia slip catalyst, according to various exemplary embodiments. The architectures may be used with the system of FIG. 1.

Still referring to FIG. 1, the heater 125 is located in the exhaust flow path before the aftertreatment system 120 and is structured to controllably heat the exhaust gas upstream of the aftertreatment system 120. In some embodiments, the heater 125 is located directly before the SCR 123. In other embodiments, the heater 125 is integrated directly into components of the aftertreatment system (e.g., SCR 123, ASC 124) in order to form an electric heated catalyst (EHC). FIG. 2 shows example architectures for the heater 125 within the aftertreatment system 120, according to various exemplary embodiments. As shown in FIG. 2, a first architecture 210 shows the heater 125 downstream of the engine 110 but upstream of both the SCR 123 and the ASC 124. A second architecture 220 shows the heater 125 downstream of the engine 110, upstream of the ASC 124, but directly integrated into the SCR 123 (forming an EHC). A third architecture 230 shows the heater 125 downstream of both the engine 110 and the SCR 123 but directly integrated into the ASC 124 (forming an EHC).

The heater 125 may be any type of heat source that is structured to increase the temperature of passing exhaust gas, which, in turn, increases the temperature of components in the aftertreatment system 120, such as the DOC 122 or the SCR 123. Thus, the heater 125 may heat the exhaust gas directly and/or heat components (e.g., the SCR) to heat the exhaust gas indirectly (or, raise the temperature of those components, such as the SCR catalyst, directly). As such, the heater may be an electric heater, such as an induction heater or a microwave heater, or a fuel-burning (e.g., HC fuel) heater. As shown here, the heater 125 is an electric heater that draws power from a battery of the system 100. In other embodiments, a different power source may be power the heater (e.g., gaseous or liquid fuel, a battery or other electrical source integrated with the heater, etc.). The heater 125 may be controlled by the controller 140. For example, the heater 125 may be controlled during an active regeneration event in order to heat the exhaust gas (e.g., by convection). Alternatively, the heater may be positioned proximate a desired component to heat the component (e.g., DOC or DPF) by conduction (and possibly convection). Multiple heaters may be used with the exhaust aftertreatment system, and each may be structured the same or differently (e.g., conduction, convection, etc.).

Referring still to FIG. 1, an operator input/output (I/O) device 130 is also shown. The operator I/O device 130 may be communicably coupled to the controller 140, such that information may be exchanged between the controller 140 and the I/O device 130, wherein the information may relate to one or more components of FIG. 1 or determinations (described below) of the controller 140. The operator I/O device 130 enables an operator of the vehicle 100 to communicate with the controller 140 and one or more components of the vehicle 100 of FIG. 1. For example, the operator input/output device 130 may include, but is not limited to, an interactive display, a touchscreen device, one or more buttons and switches, voice command receivers, etc.

Figure 3:
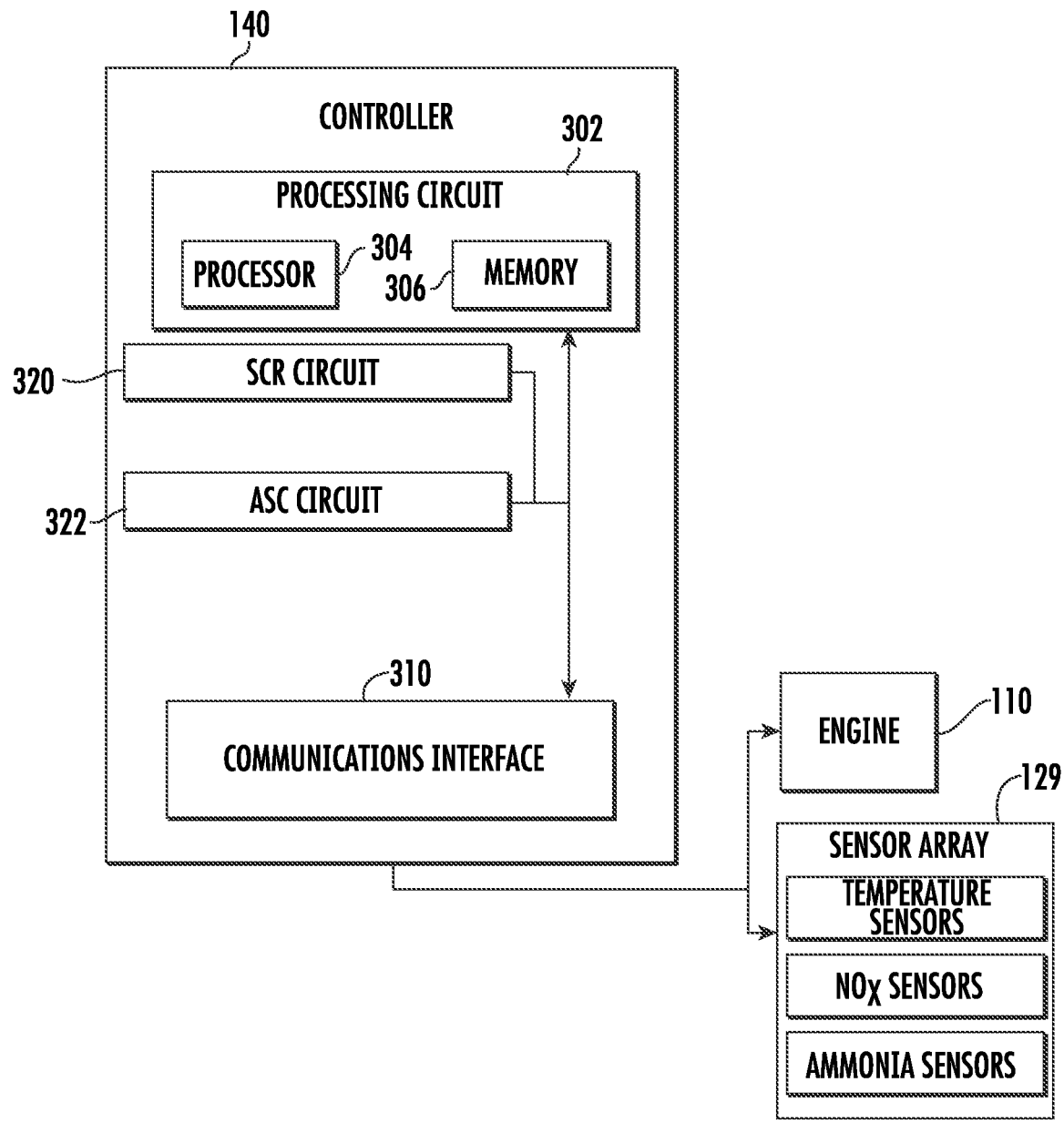
FIG. 3 is a schematic diagram of the controller of the system of FIG. 1, according to an exemplary embodiment.

Briefly referencing FIG. 3, as also shown, a sensor array 129 is included in the aftertreatment system 120. The sensors are coupled to the controller 140, such that the controller 140 can monitor and acquire data indicative of operation of the system 100. In this regard, the sensor array includes NOx sensors 128 and temperature sensors 127. The NOx sensors 128 acquire data indicative of or, if virtual, determine a NOx amount at or approximately at their disposed location. The temperature sensors 127 acquire data indicative of or, if virtual, determine an approximate temperature of the exhaust gas at or approximately at their disposed location. It should be understood that the depicted locations, numbers, and type of sensors are illustrative only. In other embodiments, the sensors may be positioned in other locations, there may be more or less sensors than shown, and/or different/additional sensors may also be included with the system 100 (e.g., a pressure sensor, an ammonia sensor, a flow rate sensor, etc.). Those of ordinary skill in the art will appreciate and recognize the high configurability of the sensors in the system 100.

The controller 140 is structured to control, at least partly, the operation of the system 100 and associated sub-systems, such as the engine 110 and the operator input/output (I/O) device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 3.

As the components of FIG. 1 are shown to be embodied in the system 100 which is embodied in a vehicle, the controller 140 may be structured as one or more electronic control units (ECU). The function and structure of the controller 140 is described in greater detail in FIG. 2. The controller 140 may be separate from or included with at least one of a transmission control unit, an exhaust aftertreatment control unit, a powertrain control module, an engine control module, etc. In one embodiment, the components of the controller 140 are combined into a single unit. In another embodiment, one or more of the components may be geographically dispersed throughout the system or vehicle. All such variations are intended to fall within the scope of the disclosure. The controller 140 may be structured as one or more electronic control units (ECU). The function and structure of the controller 140 is described in greater detail in FIG. 3.

Referring now to FIG. 3, a schematic diagram of the controller 140 of the system 100 of FIG. 1 is shown according to an example embodiment. As shown in FIG. 3, the controller 140 includes a processing circuit 302 having a processor 304 and a memory 306, a SCR circuit 320, an ASC circuit 322, and a communications interface 310. The controller 140 is configured or structured to determine if conditions are present for a high likelihood of ammonia slip, and to command the heater 125 to engage and warm components of the aftertreatment system in order to preemptively address this potential for ammonia slip.

In one configuration, the SCR circuit 320 and the ASC circuit 322 are embodied as machine or computer-readable media storing instructions that are executable by a processor, such as processor 304. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the SCR circuit 320 and the ASC circuit 322 are embodied as hardware units, such as electronic control units. As such, the SCR circuit 320 and the ASC circuit 322 may be embodied as one or more circuitry components including, but not limited to, processing circuitry, network interfaces, peripheral devices, input devices, output devices, sensors, etc. In some embodiments, the SCR circuit 320 and the ASC circuit 322 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the SCR circuit 320 and the ASC circuit 322 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The SCR circuit 320 and the ASC circuit 322 may also include programmable hardware devices such as field programmable gate arrays, programmable array logic, programmable logic devices or the like. The SCR circuit 320 and the ASC circuit 322 may include one or more memory devices for storing instructions that are executable by the processor(s) of the SCR circuit 320 and the ASC circuit 322. The one or more memory devices and processor(s) may have the same definition as provided below with respect to the memory 306 and processor 304. In some hardware unit configurations, the SCR circuit 320 and the ASC circuit 322 may be geographically dispersed throughout separate locations in the system and/or vehicle. Alternatively and as shown, the SCR circuit 320 and the ASC circuit 322 may be embodied in or within a single unit/housing, which is shown as the controller 140.

In the example shown, the controller 140 includes the processing circuit 302 having the processor 304 and the memory 306. The processing circuit 302 may be structured or configured to execute or implement the instructions, commands, and/or control processes described herein with respect to the SCR circuit 320 and the ASC circuit 322. The depicted configuration represents the SCR circuit 320 and the ASC circuit 322 as machine or computer-readable media storing instructions. However, as mentioned above, this illustration is not meant to be limiting as the present disclosure contemplates other embodiments where the SCR circuit 320 and the ASC circuit 322, or at least one circuit of the SCR circuit 320 and the ASC circuit 322, is configured as a hardware unit. All such combinations and variations are intended to fall within the scope of the present disclosure.

The processor 304 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the SCR circuit 320 and the ASC circuit 322 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 306 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 306 may be communicably connected to the processor 304 to provide computer code or instructions to the processor 304 for executing at least some of the processes described herein. Moreover, the memory 306 may be or include tangible, non-transient volatile memory or non-volatile memory. Accordingly, the memory 306 may include database components, object code components, script components, or any other type of information structure for supporting the various activities and information structures described herein.

The SCR circuit 320 is structured or configured to determine that there is a potential for ammonia slip and, in response, slowly heat the SCR 123 in order to reduce the rate at which ammonia stored on the SCR 123 is released into the exhaust gas stream. A "potential for ammonia slip" or "an ammonia slip condition" refers to an aftertreatment system 120 condition associated with a likelihood of ammonia slip. At low temperatures of the overall aftertreatment system 120 and until higher temperatures (e.g., approximately 250° C.), ammonia released from the SCR 123 is likely to cause ammonia slip because the ASC 124 does not light-off (reach an operating temperature/characteristic to actively oxidize excess ammonia at a desired rate). However, if there is a relatively less amount of ammonia stored on the SCR 123 (i.e., lower levels of ammonia storage), ammonia does not start releasing from the SCR 123 until higher overall aftertreatment system 120 temperatures, at which point the ASC 124 is more likely to have reached light-off (i.e., reached a temperature to oxidize ammonia at a desired rate). Therefore, when ammonia does start to release from the SCR 123, the ASC 124 is prepared to actively oxidize the released ammonia thereby reducing the likelihood and/or the amount of ammonia slip.

Figure 4:
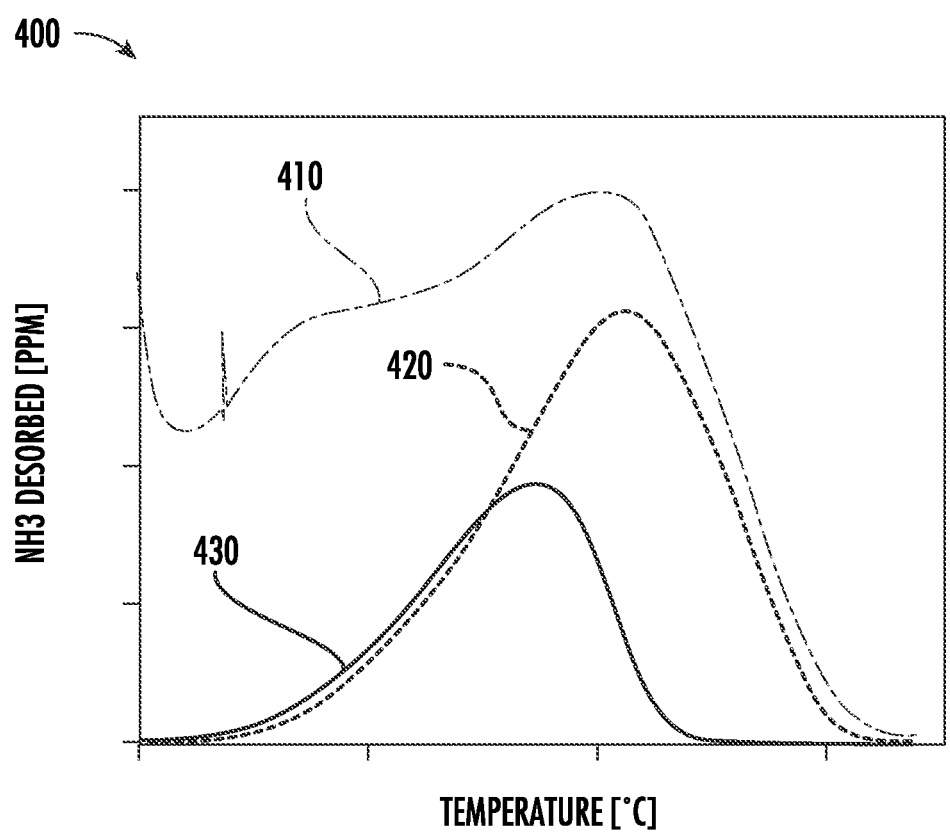
FIG. 4 is a chart of experimental values depicting an amount of ammonia release as a function of SCR temperature, accordingly to an exemplary embodiment.

FIG. 4 is a chart 400 of experimental values showing an amount of ammonia release as a function of SCR 123 temperature, accordingly to an exemplary embodiment. The x-axis of chart 400 reflects a temperature of the SCR 123 and is given in units of degrees Celsius (° C.), with values increasing from left to right. The y-axis of chart 400 reflects an amount of ammonia released from storage and is given in units of parts per million (ppm), with values increasing from bottom to top. Line 410 plots a value of the amount of ammonia released from a fully saturated (i.e., full ammonia storage) SCR 123. Line 420 plots a value of the amount of ammonia released from a partially saturated (i.e., not full ammonia storage) SCR 123 under inert conditions (e.g., the exhaust is substantially non-oxygen containing). Line 430 plots a value of the amount of ammonia released from a partially saturated SCR 123 under oxidizing conditions (e.g., the exhaust contains 10% $O_2$). Comparing line 420 and 430 suggests that no $NH_3$ oxidation is occurring on SCR catalyst below 350° C.; in other words, $NH_3$ released below 350 C will reach AMOx. As is evident, when the SCR 123 is less saturated (as in lines 420 and 430), ammonia release does not occur in substantial quantities until the SCR 123 is much warmer, while ammonia release occurs even at low temperatures for a fully saturated SCR 123.

In one embodiment in which the sensor array includes the NOx sensor 128 but not an NH3 sensor, the SCR circuit 320 determines that there is a potential for ammonia slip based on a sensed amount of system-out $NO_x$ (SONOx) being greater than a sensed amount of engine-out NOx (EONOx) by more than a predefined threshold amount. In some embodiments, these sensed amounts are from one or more real sensors positioned throughout the system 100 (e.g., at an outlet of the engine 110, at an outlet of the aftertreatment system 120, etc.). In another embodiment, one or more of the SONOx and EONOx sensors are virtual sensors that make determinations or estimates based on operating conditions of the system (e.g., at various engine power demands and operating characteristics, the virtual SONOx sensor estimates the system out NOx to be a value of X). Each of the real and virtual sensor embodiments are intended to fall within the scope of the present disclosure.

As mentioned above, the SCR circuit 320 is configured or structured to determine there is a potential for ammonia slip when the SONOx amount or value is greater than the EONOx value or amount. Because excess ammonia can be read as NOx by tailpipe sensors and because NOx is likely only generated by the engine 110, EONOx values or amounts exceeding SONOx values or amounts is attributable to unreacted ammonia in the exhaust gas stream. NOx sensors are generally "cross-sensitive" (i.e., reads $NH_3$ as NOx) because the NOx sensors are operated at high temperatures (e.g., >200° C.) and $NH_3$ is oxidized to NOx within the sensor due to the high temperatures, which causes the NOx sensors to read the $NH_3$ as NOx. Typically, this cross-sensitivity is around 0.9-1, which means that 100 ppm of $NH_3$ is read by a NOx sensor as 90-100 ppm of NOx. As such, unless there are errors in the system 100 (which may be evidenced by one or more fault codes being active), due to the low likelihood of additional NOx being generated between the engine-out sensor and the system-out sensor, the SCR circuit 320 determines that the increase in sensed NOx between the engine-out sensor and system-out sensor is due to the system-out sensor reading ammonia in the exhaust as NOx. In this way, Applicant has determined that the excess NOx reading between the SONOx sensor and the EONOx sensor is due to the presence of ammonia. The SCR circuit 320 determines that the excess amount is the ammonia slip amount. This determined ammonia slip amount may be compared against an ammonia slip threshold value and operating temperatures to determine if a potential for ammonia slip is likely (i.e., the determined ammonia slip amount exceeds the threshold value, then the SCR circuit determines that ammonia slip is likely). In other words, when the sensed amount of SONOx exceeds the sensed amount of EONOx by more than the predefined threshold, the SCR circuit 320 determines that there is a potential (i.e., more likely than not) that ammonia slip is occurring or will occur.

This potential for ammonia slip determination may be used by the SCR circuit 320 when the system does not include ammonia sensors (i.e., direct readings of ammonia amounts, stored or transient amounts) are not possible.

In another embodiment in which the sensor array 129 includes an NH3 sensor, the SCR circuit 320 determines that there is a potential for ammonia slip based on a sensed amount of ammonia in the exhaust gas stream exceeding a slip threshold (e.g., 500 ppm, 80% saturation level, etc.). The $NH_3$ sensor in this embodiment may be embedded in the SCR 123 or ASC 124, may be downstream of the aftertreatment system 120 (i.e., a tailpipe sensor), or may be an NH3 radio frequency (RF) sensor.

In another embodiment in which the system 100 does not include $NH_3$ sensors, $NH_3$ saturation level (or ammonia storage level) could be also determined via a virtual sensor that utilizes one or more of data from engine-out NOx sensors, data from tailpipe NOx sensors, DEF dosing rate, estimated exhaust flow, and data from temperature sensors 127, which are processed through embedded models running on the controller 140. Similarly to the embodiments in which the sensor array 129 includes an $NH_3$ sensor, if the controller 140 determines the predicted NH3 saturation level to be above a certain threshold, the SCR circuit 320 determines that there is a potential $NH_3$ slip risk.

In response to the SCR circuit 320 determining that there is a potential for ammonia slip, the SCR circuit 320 determines a status of ammonia storage in the aftertreatment system 120 in one or more of various situations, conditions, or locations. In particular, the SCR circuit 320 determines a status of ammonia storage based on a temperature of one or more components in the aftertreatment system 120.

In a first embodiment, the SCR circuit 320 makes this determination regarding ammonia storage based on a temperature of the SCR 123. If the temperature of the SCR 123 is below a predefined threshold (e.g., 250° C., the light-off temperature, etc.), the SCR circuit 320 determines that there is likely an unacceptable amount of ammonia stored on the SCR because ammonia storage is higher at lower temperatures. In some embodiments, the SCR circuit 320 determines that the SCR 123 temperature is below a threshold instantaneously (i.e., at a moment in time), while in other embodiments, the SCR circuit 320 makes the determination that the SCR 123 temperature is below a threshold if the SCR 123 temperature remains below the threshold value for a certain period of time (e.g., 30 seconds). For example, if the system is operating for X seconds or minutes with DEF dosing and the SCR 123 is below the threshold temperature during this time, then the SCR circuit 320 determines that ammonia is stored in the SCR above a threshold level. This increased ammonia storage at lower temperatures is due to unreacted $NH_3$ accumulation with time. Once the temperature rises (i.e., through operation), the stored ammonia is released into the exhaust gas stream. As such, lower SCR 123 temperatures are indicative of a higher amount of stored ammonia on the SCR 123.

In a second embodiment, the SCR circuit 320 makes this determination based on a temperature of the ASC 124. If the temperature of the ASC 124 is below a predefined threshold (e.g., 250° C., the light-off temperature, etc.), the SCR circuit 320 determines that the ASC 124 is likely unable to properly oxidize excess ammonia in the exhaust stream. In some embodiments, the SCR circuit 320 determines that the ASC 124 temperature is below a threshold instantaneously (i.e., at a moment in time), while in other embodiments, the SCR circuit 320 makes the determination that the ASC 124 temperature is below a threshold if the ASC 124 temperature remains below the threshold value for a certain period of time (e.g., 30 seconds). As such and when the ASC 124 temperature is below the predefined threshold temperature, ammonia that remains unreacted in the exhaust stream is likely to slip into the atmosphere at an unacceptable level. The SCR circuit 320, therefore, may determine that a condition of high ammonia storage (e.g., an amount of stored ammonia exceeding a threshold above which the aftertreatment system 120 is unable to convert substantially all of the stored ammonia, if released) in the aftertreatment system 120 is present if the temperature of either the SCR 123 or the ASC 124 is below a predefined threshold. In an alternative embodiment, the SCR circuit 320 determines that high ammonia storage is present if the temperatures of both the SCR 123 and the ASC are below the predefined threshold. Determining that there is a potential for ammonia slip and a high amount of ammonia storage by tracking temperatures of at least the SCR 123 and ASC 124 is beneficial because there is no need for an NH3 sensor, allowing for sufficient ammonia slip detection for those systems either lacking an NH3 sensor or operating with a malfunctioning NH3 sensor.

In response to the SCR circuit 320 determining that the status of ammonia storage in the aftertreatment system 120 is unacceptable (i.e., that an amount of stored ammonia is beyond a threshold desired amount), the SCR circuit 320 engages, activates, increases temperature/power, etc. of the heater 125 to slowly warm (e.g., less than 30° C./minute) the SCR 123. The heater may either be positioned in the exhaust stream upstream of the SCR 123 (as shown in the first architecture 210) or be integrated into the SCR 123 (as shown in the second architecture 220). By slowly warming the SCR 123, the SCR circuit 320 causes the SCR 123 to slowly release the stored ammonia, which reduces the potential for ammonia slip by reducing the amount of ammonia the ASC 124 has to oxidize before the ASC 124 has had time to reach a desired operating temperature (the light-off temperature range or threshold). In some embodiments, the SCR circuit 320 may concurrently reduce DEF dosing. The SCR circuit 320 then disengages, deactivates, reduces temperature/power, etc. of the heater 125 based on the SCR 123 being above a predefined threshold temperature (e.g., 300° C.) or if an operating characteristic of the SCR 123 is above a predefined threshold (e.g., an SCR 123 conversion efficiency above 99%).

Referring now to FIG. 5A, a flow chart of a first method 500 utilized by the SCR circuit 320 and controller 140 to slowly raise the temperature of the SCR 123 in order to reduce ammonia storage is shown, according to an exemplary embodiment. At process 510, the controller 140 determines that there is a potential for ammonia slip based on a sensed amount of system-out NOx (SONOx) exceeding a sensed amount of engine-out NOx (EONOx) by more than a threshold amount (510:YES). At process 520, the controller 140 determines if the temperature of either the SCR 123 or the ASC 124 is less than a predefined threshold. If no, the method 500 returns to process 510 (520:NO) to continue checking SONOx and EONOx values. If yes, the method 500 proceeds to process 530 (520:YES) and the controller 140 commands the heater 125 to engage (i.e., activate, turn on, increase temperature power) and slowly warm the SCR 123. In some embodiments, "slowly warm" refers to a flat rate at which the temperature of the SCR 123 is increased (e.g., 30° C./minute), while in other embodiments, the rate at which the heater 125 "slowly warms" the SCR 123 is based on a current temperature of the SCR 123 relative to a target SCR 123 temperature (e.g., "light off" temperature). In these embodiments, the greater the difference between the current temperature and the target temperature, the greater the rate at which the heater 125 warms the SCR 123 (i.e., the heater 125 is activated to full power instead of operated at a reduced power). Furthermore, this determination could include a comparison to a threshold value, such that the heater 125 fully engages (i.e., 'on' at full power) if the difference between the current and target temperatures exceeds the threshold value, and partially engages (i.e., 'on' at less-than-full power) if the difference is less than the threshold value.

In some embodiments, the method 500 continues to process 535, where the controller 140 commands the DEF doser to reduce dosing levels. From process 530 or process 535, the method 500 proceeds to process 540, where the controller 140 determines if the temperature of the SCR 123 exceeds a threshold (i.e., whether the SCR 123 has reached an operating temperature). If the temperature of the SCR 123 is not yet to the threshold, the method returns to process 530 (540:NO) to continue heater 125 engagement. If the temperature of the SCR 123 exceeds the threshold, the method 500 continues to process 545 where the controller 140 commands the heater 125 to disengage.

Referring now to FIG. 5B, a flow chart of a second method 550 utilized by the SCR circuit 320 and controller 140 to slowly raise the temperature of the SCR 123 in order to reduce ammonia storage is shown, according to an exemplary embodiment. At process 560, the controller 140 determines that there is a potential for ammonia slip based on a sensed amount of ammonia (or predicted amount of ammonia) in the exhaust gas stream exceeding a threshold value. If yes, the method 550 proceeds to process 570 (560:YES), where the controller 140 determines if the temperature of either the SCR 123 or the ASC 124 is less than a predefined threshold. If no, the method 550 returns to process 560 (570:NO) to continue checking ammonia in the exhaust stream. If yes, the method 550 proceeds to process 580 (470:YES) and the controller 140 commands the heater 125 to engage and slowly warm the SCR 123 where "slowly warm" is defined above. In some embodiments, the method 550 continues to process 585, where the controller 140 commands the DEF doser to reduce dosing levels. From process 580 or process 585, the method 550 proceeds to process 590, where the controller 140 determines if the temperature of the SCR 123 exceeds a threshold (i.e., whether the SCR 123 has reached an operating temperature). If the temperature of the SCR 123 is not yet to the threshold, the method returns to process 580 (590:NO) to continue heater 125 engagement (e.g., maintain heater 125 being on, maintaining a temperature/power setting on the heater 125, etc.). If the temperature of the SCR 123 exceeds the threshold, the method 550 continues to process 595 where the controller 140 commands the heater 125 to disengage.

It should be understood that as part of the "slow warm" process, the heater 125 may be activated at various power outputs throughout the process. Thus, a constant power output may be used in some instances while in other instances, a variable amount of power output over time may be used.

The ASC circuit 322 is structured or configured to determine that there is a potential for ammonia slip and, in response, heat the ASC 124 to prepare the ASC 124 to oxidize ammonia. As discussed above, the reaction between the ASC 124 and ammonia in the exhaust stream is more efficient at higher temperatures (e.g., 250° C.). At lower temperatures, the ASC 124 may not be able to oxidize ammonia at a desired efficiency, which may lead to unacceptable levels of ammonia slip. By heating the ASC 124 in anticipation of predicted conditions for ammonia slip, the ASC circuit 322 reduces the amount of and/or potential for ammonia slip.

In one embodiment in which the sensor array includes the NOx sensor 128 but not an NH3 sensor, the ASC circuit 322 determines that there is a potential for ammonia slip based on a sensed amount of system-out NOx (SONOx) being greater than a sensed amount of engine-out NOx (EONOx). Because excess ammonia can be read as NOx by tailpipe sensors and because NOx is only generated by the engine 110, any amount by which an EONOx sensed amount exceeds a SONOx sensed amount is attributable to unreacted ammonia in the exhaust stream, due to the low likelihood of additional NOx being generated between the engine-out sensor and the system-out sensor. As such, when the sensed amount of SONOx exceeds the sensed amount of EONOx by more than the predefined threshold, the SCR circuit 320 determines that there is a potential (i.e., more likely than not) that ammonia slips is occurring or will occur. In another embodiment in which the sensor array 129 includes an NH3 sensor, the ASC circuit 322 determines that there is a potential for ammonia slip based on a sensed amount of ammonia in the exhaust gas stream exceeding a slip threshold (e.g., 500 ppm, 80% saturation level, etc.) The NH3 sensor in this embodiment may be embedded in the SCR 123 or ASC 124, may be downstream of the aftertreatment system 120 (i.e., a tailpipe sensor), or may be an $NH_3$ radio frequency (RF) sensor. Alternatively, the determination(s) of a possibility of ammonia slip may be performed by the SCR circuit and provided to the ASC circuit 322. This arrangement may be beneficial to reduce duplicative computations in order to, for example, save processing power and provide faster determinations.

In response to the ASC circuit 322 determining that there is a potential for ammonia slip, the ASC circuit 322 determines if a transient event is occurring or likely to occur. In one embodiment, the ASC circuit 322 determines that a transient event is occurring or likely to occur based on a fueling rate for the engine exceeding a predefined high fueling rate threshold for a period of time. For example, if the fueling rate exceeds 250 milligram/stroke for 30 seconds, the ASC circuit 322 determines that a transient event is occurring. Alternatively or additionally, the ASC circuit 322 may determine that a transient event is occurring or likely to occur based on a modelled temperature of the aftertreatment system 120 based on various conditions of the system 100 (e.g., predicted upcoming load conditions for the system based on a grade ahead of the system 100 to determine a modelled temperature for the aftertreatment system 120). For example, the ASC circuit 322 may predict or determine an aftertreatment system 120 temperature based on system 100 operating parameters (e.g., fueling rate, power demand, EONOx). If the predicted aftertreatment system 120 temperature exceeds a predefined threshold (or, a difference between the current temperature and the predicted increased temperature exceeds a predefined delta amount), the ASC circuit 322 determines that a transient event is occurring. During a transient event, the engine-out exhaust temperature may increase due to the heightened fueling levels, and the hot exhaust gas warms the aftertreatment system 120. As the aftertreatment system 120 warms, the SCR 123 begins to release stored ammonia, which can lead to ammonia slip if the ASC 124 is insufficiently warm (i.e., below a threshold temperature such as 250° C.). In particular and according to one embodiment, the ASC circuit 322 determines that a transient cycle or event is occurring when the SCR is operated at or below a threshold temperature (250 C) for a relatively long period of time in which the catalyst keeps storing significant amounts of NH3 and then the SCR experiences a sudden temperature ramp to an elevated temperature (e.g., 300 C). This situation can lead to significant NH3 slip (greater than 400 ppm).

As such, if the ASC circuit 322 determines that a transient event is occurring, the ASC circuit 322 commands the heater 125 to begin warming the ASC 124 directly. Here, the heater 125 is incorporated into the ASC 124, as shown in the third architecture 230, and hence the direct warming of the ASC 124. By focusing on heating the ASC 124 directly (as opposed to indirectly via hot exhaust gas or an upstream heater), the ASC circuit 322 can more quickly warm the ASC 124 to light-off (i.e., a desired or preferred operating temperature). Experimental data have shown that the time it takes for the ASC 124 to light-off when directly targeted by the heater 125 is roughly equal to the length of time it takes for the SCR 123 to reach an operating temperature (and to begin releasing ammonia at high quantities) from the beginning of a high-fueling transient event.

Figure 6:
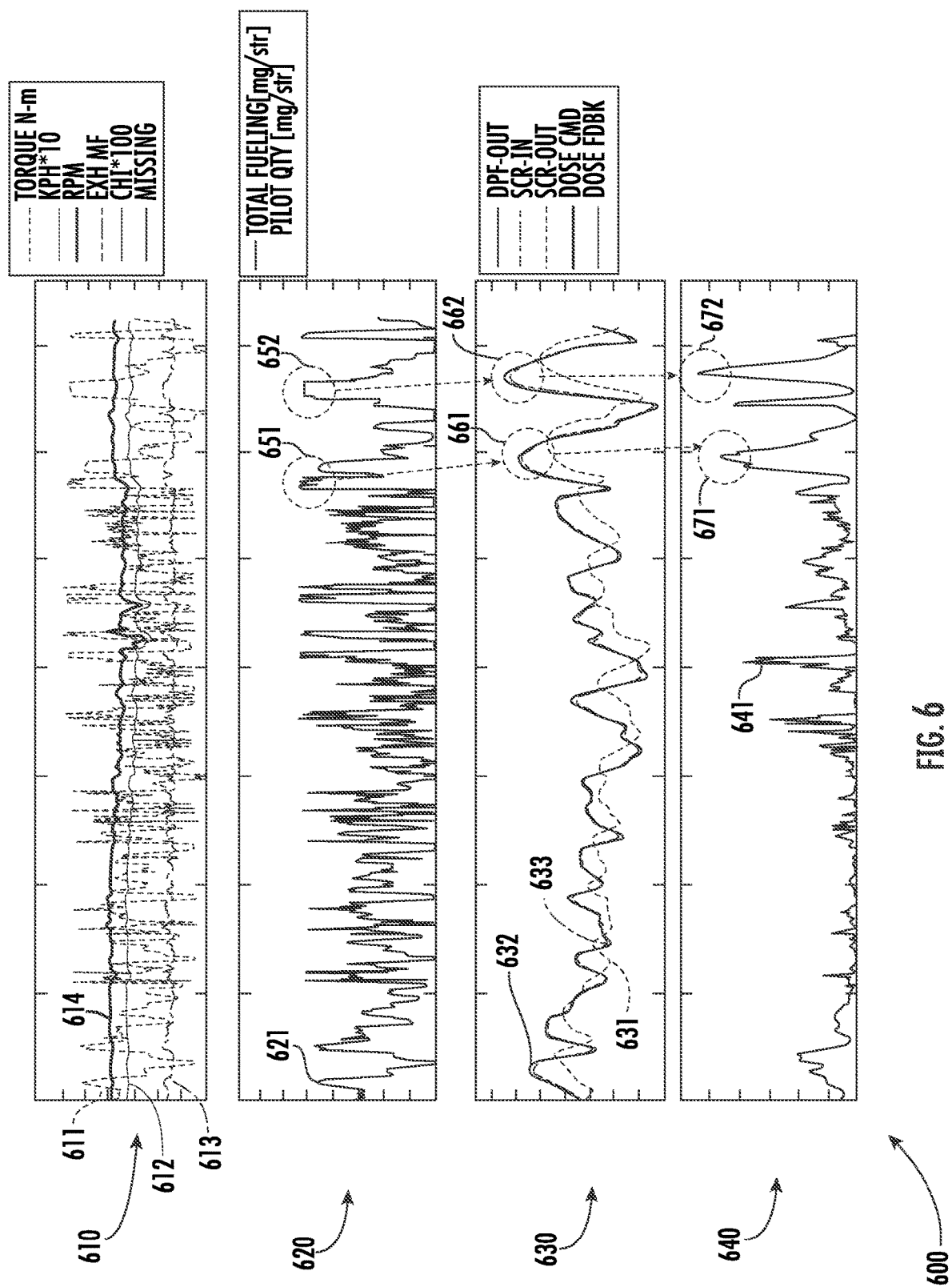
FIG. 6 is a set of charts of experimental values of speed/torque, fueling, aftertreatment system temperature, and NOx values versus time to indicate ammonia slip instances relative to time, according to an exemplary embodiment.

FIG. 6 is a set of charts of experimental values regarding speed/torque, fueling, aftertreatment system temperature, and NOx sensor signal versus time to indicate ammonia slip instances relative to time, according to an exemplary embodiment. These experiment values include fueling levels over time, aftertreatment system 120 temperature over time, and ASC 124 temperature over time, according to an exemplary embodiment. As shown in FIG. 6, the x-axis for each of charts 610, 620, 630, and 640 reflects duration of system 100 operation and is given in units of time, and each of plots 610, 620, 630, and 640 are aligned with regard to the x-axis, such that each chart can be read from top to bottom. The y-axis of chart 610 reflects numeric numbers of each parameter of different units and includes lines 611, 612, 613, and 614. Line 611 plots an experimental value of engine 110 torque (given in Newton-meters) over time, line 612 plots an experimental value of vehicle speed over time (given in kilometers per hour*10), line 613 plots an experimental value of exhaust mass flow over time (given in kilograms per minute), and line 614 plots engine speed (given in revolutions per minute) over time. Generally speaking, lines 611, 612, 613, and 614 reflect values for normal operation of the system 100. The y-axis of chart 620 reflects engine fueling rate and is given in units of milligrams per stroke, and includes line 621. Line 621 plots an experimental value of total fueling levels into the engine 110 over time. The y-axis of chart 630 reflects both temperature and is given in units of Celsius. Chart 630 includes lines 631, 632, and 633, which each chart experimental values for temperatures within the aftertreatment system 120. Line 631 plots an experimental value of SCR 123 outlet temperature, line 632 plots an experimental value of DPF 121 outlet temperature, and line 633 plots an experimental value of SCR 123 inlet temperature. The y-axis of chart 640 reflects a sensed amount of NOx reading in the exhaust flow at the aftertreatment system 120 outlet (i.e., tailpipe) and is given in units of ppm (%). Chart 640 includes line 641, which plots an experimental value of SONOx readings in a system 100 that does not include an NH3 sensor.

As shown in FIG. 6, a relative spike in fueling levels directly leads to a relative spike in aftertreatment system 120 temperatures, which leads to a relative spike in sensed SONOx. Because excess ammonia can be read as NOx by tailpipe sensors, when a spike in NOx is sensed by the tailpipe sensor without a corresponding high NOx event (e.g., high exhaust temperatures due to leaner air/fuel ratios), the spike in sensed SONOx indicates likely ammonia slip. Referring to plot 620, circles 651 and 652 identify two relative spikes in fueling levels. As indicated by the arrows, these relative spikes are followed by relative spikes in aftertreatment system 120 component temperatures, identified by circles 661 and 662 on plot 630. Further, these relative spikes in aftertreatment system 120 component temperatures lead to relative spikes in sensed SONOx, as identified by circles 671 and 672 on plot 640. Due to the nature of systems without NH3 sensors, this increase in SONOx likely indicates an increase in unreacted ammonia exiting the exhaust stream (i.e., ammonia slip). As such, Applicant has determined that an increase in fueling levels leads directly to an increase in ammonia slip that is supported by the experimental data shown in the figures herein. Based on this experimental data then, the ASC circuit 322 predicts or determines a likelihood of ammonia slip when determining an increase in fueling levels and takes action to attempt to prevent this ammonia slip. By directly heating the SCR 123 or ASC 124, the ASC circuit 322 shortens the amount of time the ASC 124 takes to reach peak operating temperature so that the ASC 124 reaches an operating temperature roughly when the amount of unreacted ammonia peaks.

Referring now to FIG. 7A, a flow chart of a first method 700 utilized by the ASC circuit 322 and controller 140 to raise the temperature of the ASC 124 to reduce ammonia slip is shown, according to an exemplary embodiment. At process 710, the controller 140 determines that there is a potential for ammonia slip based on a sensed (i.e., by a system-out or tailpipe NOx sensor) amount of system-out NOx (SONOx) exceeding a sensed (i.e., by an engine-out NOx sensor) amount of engine-out NOx (EONOx). This is an ammonia slip that is associated with a likelihood of ammonia slip. If yes, the method 700 proceeds to process 720 (710:YES), where the controller 140 determines if the overall fueling levels into the engine 110 exceed a predefined threshold. If no, the method 700 returns to process 710 (720:NO) to continue checking SONOx and EONOx. If yes, the method 700 proceeds to process 730 (720:YES) and the controller 140 commands the heater 125 to engage and slowly warm the ASC 124. From process 730, the method 700 proceeds to step 740, where the controller 140 determines if the temperature of the ASC 124 exceeds a threshold (i.e., whether the ASC 124 has reached an operating temperature). If the temperature of the ASC 124 is not yet to the threshold temperature, the method returns to process 730 (740:NO) to continue heater 125 engagement. If the temperature of the ASC 124 exceeds the threshold, the method 700 continues to process 745 where the controller 140 commands the heater 125 to disengage.

FIG. 7B is a flow chart of a second method 750 utilized by the ASC circuit 322 and controller 140 to raise the temperature of the ASC 124 in order to reduce ammonia slip. At process 760, the controller 140 determines that there is a potential for ammonia slip based on a sensed amount of ammonia in the exhaust gas stream exceeding a threshold. If yes, the method 750 proceeds to process 770 (760: YES), where the controller 140 determines if the overall fueling levels into the engine 110 exceed a predefined threshold. If no, the method 750 returns to process 760 (770:NO) to continue checking ammonia in the exhaust stream. If yes, the method 750 proceeds to process 780 (770:YES) and the controller 140 commands the heater 125 to engage and slowly warm the ASC 124. In some embodiments, "slowly warm" refers to a flat rate at which the temperature of the ASC 124 is increased (e.g., 30° C./minute), while in other embodiments, the rate at which the heater 125 "slowly warms" the ASC 124 is based on a current temperature of the ASC 124 relative to a target ASC 124 temperature (e.g., "light off" temperature). In these embodiments, the greater the difference is between the current temperature and the target temperature, the greater the rate at which the heater 125 warms the ASC 124. Furthermore, this determination could include a comparison to a threshold value, such that the heater 125 fully engages (i.e., "on" at full power) if the difference between the current and target temperatures exceeds the threshold value, and partially engages (i.e., 'on' at less-than-full power) if the difference is less than the threshold value. From process 780, the method 750 proceeds to process 790, where the controller 140 determines if the temperature of the ASC 124 exceeds a threshold (i.e., whether the ASC 124 has reached an operating temperature).

If the temperature of the ASC 124 is not yet to the threshold, the method returns to process 780 (790:NO) to continue heater 125 engagement. If the temperature of the ASC 124 exceeds the threshold, the method 750 continues to process 795 where the controller 140 commands the heater 125 to disengage.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 3, it should be understood that the controller 140 may include any number of circuits for completing the functions described herein. For example, the activities and functionalities of the SCR circuit 320 and the ASC circuit 322 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 304 of FIG. 3. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A method comprising:
    receiving, by a controller, data regarding operation of an exhaust aftertreatment system;
    determining, by the controller, that a condition for ammonia slip is present based on the data regarding operation of the exhaust aftertreatment system;
    determining, by the controller, that a condition for ammonia storage is present based on an engine fueling rate exceeding a transient threshold; and
    commanding, by the controller, a heater to activate and warm a component of the exhaust aftertreatment system to reduce a stored amount of ammonia, the component being an Ammonia Slip Catalyst (ASC).

2. The method of claim 1, wherein the condition for ammonia slip is at least one of a sensed amount of system-out NOx exceeding a sensed amount of engine-out NOx or a sensed amount of ammonia exceeding an ammonia slip threshold.

3. The method of claim 1, further comprising determining an amount of ammonia storage based on at least one of a sensed amount of engine-out NOx, a sensed amount of system-out NOx, a dosing rate of diesel exhaust fluid, an exhaust flow rate, or a sensed temperature of the exhaust aftertreatment system,
    wherein the condition for ammonia slip is the determined amount of ammonia storage exceeding an ammonia slip threshold.

4. The method of claim 1, wherein the determination that the condition for ammonia storage is present is further based on a sensed temperature of the ASC being below a threshold value.

5. The method of claim 1, wherein the heater is integrated into the ASC.

6. A system comprising:
    an exhaust aftertreatment system including a heater; and
    a controller coupled to the exhaust aftertreatment system, the controller configured to:
        receive data regarding operation of the exhaust aftertreatment system;
        determine that a condition for ammonia slip is present based on the data regarding operation of the exhaust aftertreatment system;
        determine that a condition for ammonia storage is present based on an engine fueling rate exceeding a transient threshold; and
        command the heater to activate and warm a component of the exhaust aftertreatment system to reduce a stored amount of ammonia, the component being an Ammonia Slip Catalyst (ASC).

7. The system of claim 6, wherein the condition for ammonia slip is at least one of a sensed amount of system-out NOx exceeding a sensed amount of engine-out NOx or a sensed amount of ammonia exceeding an ammonia slip threshold.

8. The system of claim 6, wherein the controller is further configured to:
    determine an amount of ammonia storage based on at least one of a sensed amount of engine-out NOx, a sensed amount of system-out NOx, or a sensed temperature of the exhaust aftertreatment system,
    wherein the condition for ammonia slip is the determined amount of ammonia storage exceeding an ammonia slip threshold.

9. The system of claim 6, wherein the determination that the condition for ammonia storage is present is further based on a sensed temperature of the ASC being below a threshold value.

10. The system of claim 6, wherein the transient threshold is a predefined high fueling rate threshold for a predefined period of time.

11. The system of claim 10, wherein the heater is integrated into the ASC.

12. A non-transitory computer-readable storage medium comprising computer-readable instructions stored thereon that, when executed by a processor of a controller, causes the controller to perform operations comprising:
  receiving data regarding operation of an exhaust aftertreatment system, the data including at least one of (i) a sensed amount of engine-out NOx and a sensed amount of system-out NOx or (ii) a sensed amount of ammonia in an exhaust gas stream;
  determining that a condition for ammonia slip is present based on (i) the sensed amount of system-out NOx exceeding a sensed amount of engine-out NOx, or (ii) the sensed amount of ammonia in the exhaust gas stream exceeding a threshold;
  determining that a condition for ammonia storage is present based on an engine fueling rate exceeding a transient threshold; and
  commanding a heater to activate to warm a component of the exhaust aftertreatment system based on the condition for ammonia slip being present, the component being an Ammonia Slip Catalyst (ASC).

13. The non-transitory computer-readable medium of claim 12, wherein determining the condition for ammonia storage comprises:
  receiving data regarding an amount of fueling into an engine coupled to the exhaust aftertreatment system; and
  determining that the amount of fueling into the engine exceeds a predefined threshold as a prerequisite for commanding the heater to activate.

14. The non-transitory computer-readable medium of claim 12, wherein the operations further comprise:
  receiving data regarding a temperature of the component of the exhaust aftertreatment system; and
  commanding the heater to deactivate based on the temperature exceeding a predefined threshold temperature.

15. The non-transitory computer-readable medium of claim 12, wherein the heater is integrated into the ASC.

16. The non-transitory computer-readable medium of claim 12, wherein the operations further comprise:
  determining that a current temperature of the component is less than a target temperature of the component by more than a threshold value, and commanding the heater to activate at a first power level; or
  determining that the current temperature of the component is less than the target temperature of the component by less than the threshold value, and commanding the heater to activate at a second power level less than the first power level.

* * * * *